(12) United States Patent
Bruno et al.

(10) Patent No.: US 7,334,423 B2
(45) Date of Patent: Feb. 26, 2008

(54) DUAL MODE CONDENSING CYCLE

(75) Inventors: Louis J. Bruno, Ellington, CT (US); Douglas L Christians, Vernon, CT (US)

(73) Assignee: Hamilton Sundstrand Corporation, Windsors Locks, CT (US)

(*) Notice: Subject to any disclaimer, the term of this patent is extended or adjusted under 35 U.S.C. 154(b) by 281 days.

(21) Appl. No.: 11/231,538

(22) Filed: Sep. 21, 2005

(65) Prior Publication Data

US 2006/0196216 A1  Sep. 7, 2006

Related U.S. Application Data

(60) Provisional application No. 60/612,274, filed on Sep. 22, 2004.

(51) Int. Cl.
*F25D 9/00* (2006.01)
*F25D 17/04* (2006.01)

(52) U.S. Cl. .......................... 62/402; 62/404
(58) Field of Classification Search .......... 62/86–88, 62/117, 172, 401, 402, 404, 259.2, 427, 434
See application file for complete search history.

(56) References Cited

U.S. PATENT DOCUMENTS

| | | | | |
|---|---|---|---|---|
| 5,343,692 A | * | 9/1994 | Thomson et al. | 60/785 |
| 5,461,882 A | * | 10/1995 | Zywiak | 62/401 |
| 5,704,218 A | * | 1/1998 | Christians et al. | 62/172 |
| 5,967,461 A | * | 10/1999 | Farrington | 244/118.5 |
| 6,148,622 A | * | 11/2000 | Sanger | 62/88 |
| 6,199,387 B1 | * | 3/2001 | Sauterleute | 62/87 |
| 6,415,621 B2 | * | 7/2002 | Buchholz et al. | 62/402 |
| 6,615,606 B2 | * | 9/2003 | Zywiak | 62/402 |
| 6,681,592 B1 | * | 1/2004 | Lents et al. | 62/401 |
| 6,684,660 B1 | * | 2/2004 | Bruno et al. | 62/402 |
| 6,848,261 B2 | * | 2/2005 | Claeys | 62/87 |

FOREIGN PATENT DOCUMENTS

EP  459816 A1 * 12/1991

OTHER PUBLICATIONS

U.S. Patent Application "Air Cycle Air Conditioning With Adaptive Ram Heat Exchanger", U.S. Appl. No. 10/716,313, filed Nov. 18, 2003.

* cited by examiner

*Primary Examiner*—Mohammad M. Ali
(74) *Attorney, Agent, or Firm*—Carlson, Gaskey & Olds

(57) ABSTRACT

An air conditioning system is provided that includes first and second turbines and a compressor. The second turbine is in fluid communication with a pack outlet. A passage fluidly connects the first turbine and the pack outlet. A valve is associated with the passages and is movable between open and closed positions. In the open position, the valve permits flow through the passageway from the first turbine directly to the pack outlet thereby bypassing the second turbine and reducing the resistance to the flow through the system. The valve is opened at higher altitudes to change the typical series fluid connection between the turbines to a parallel fluid connection. In this configuration, the air conditioning system operates more efficiently using reduced air pressure provided to the system. Another valve is also opened to permit additional reduction in the air pressure required.

14 Claims, 3 Drawing Sheets

DUAL MODE CONDENSING CYCLE

The present application claims priority to U.S. Provisional Application Ser. No. 60/612,274, filed Sep. 22, 2004.

BACKGROUND OF THE INVENTION

This invention relates to an air conditioning system suitable for an aircraft.

Aircraft air conditioning systems include one or more heat exchangers, an air cycle machine, and conditioning circuits to provide conditioned air for an aircraft cabin and other areas of the aircraft. Typically compressed air, such as bleed air from a turbine engine, is provided to a compressor of the air cycle machine through a heat exchanger. The air is routed to another heat exchanger and through the conditioning circuits before being provided to a turbine. Expanded air from the turbine flows through the conditioning circuits and enters another turbine where the air is further expanded. The further expanded air is provided to a mixer for distribution throughout the aircraft through an air conditioning system pack outlet.

The air conditioning system's requirement for air at elevated pressure to the system varies based upon the altitude and operating condition of the aircraft. For example, higher pressure air is required during ground conditions than high altitude conditions to produce acceptable cooling. As a result, in the prior art more air pressure than needed is required by the air conditioning system at high altitude resulting in inefficient use of aircraft power to generate the higher pressure air.

To improve the efficiency of the air conditioning system and the source providing the high pressure air to the system, a variable pressure source is used so that only the level of pressure needed by the aircraft is provided. For example the air pressure to the aircraft air conditioning system is reduced at high altitudes. However, the prior art air conditioning systems are not configured to run efficiently when the source air pressure is reduced.

What is needed is an air conditioning system that runs efficiently during various altitude conditions to minimize the aircraft power needed for operation.

SUMMARY OF THE INVENTION

An air conditioning system of the present invention includes first and second turbines and a compressor. The second turbine is in fluid communication with a pack outlet. A passage fluidly connects the first turbine and the pack outlet. A valve is associated with the passages and is movable between open and closed positions. In the open position, the valve permits flow through the passageway from the first turbine directly to the pack outlet thereby bypassing the second turbine and reducing the resistance to airflow passing through the pack. The valve is opened at higher altitudes to change the typical series fluid connection between the turbines to a parallel fluid connection. In this configuration, the air conditioning system operates more efficiently using reduced aircraft power.

Another valve is also opened to permit additional flow through another passage further reducing the resistance to airflow passing through the pack.

Accordingly, the present invention provides an air conditioning system that runs efficiently during various altitude conditions These and other features of the present invention can be best understood from the following specification and drawings, the following of which is a brief description.

DETAILED DESCRIPTION OF THE PREFERRED EMBODIMENT

Figure 1:
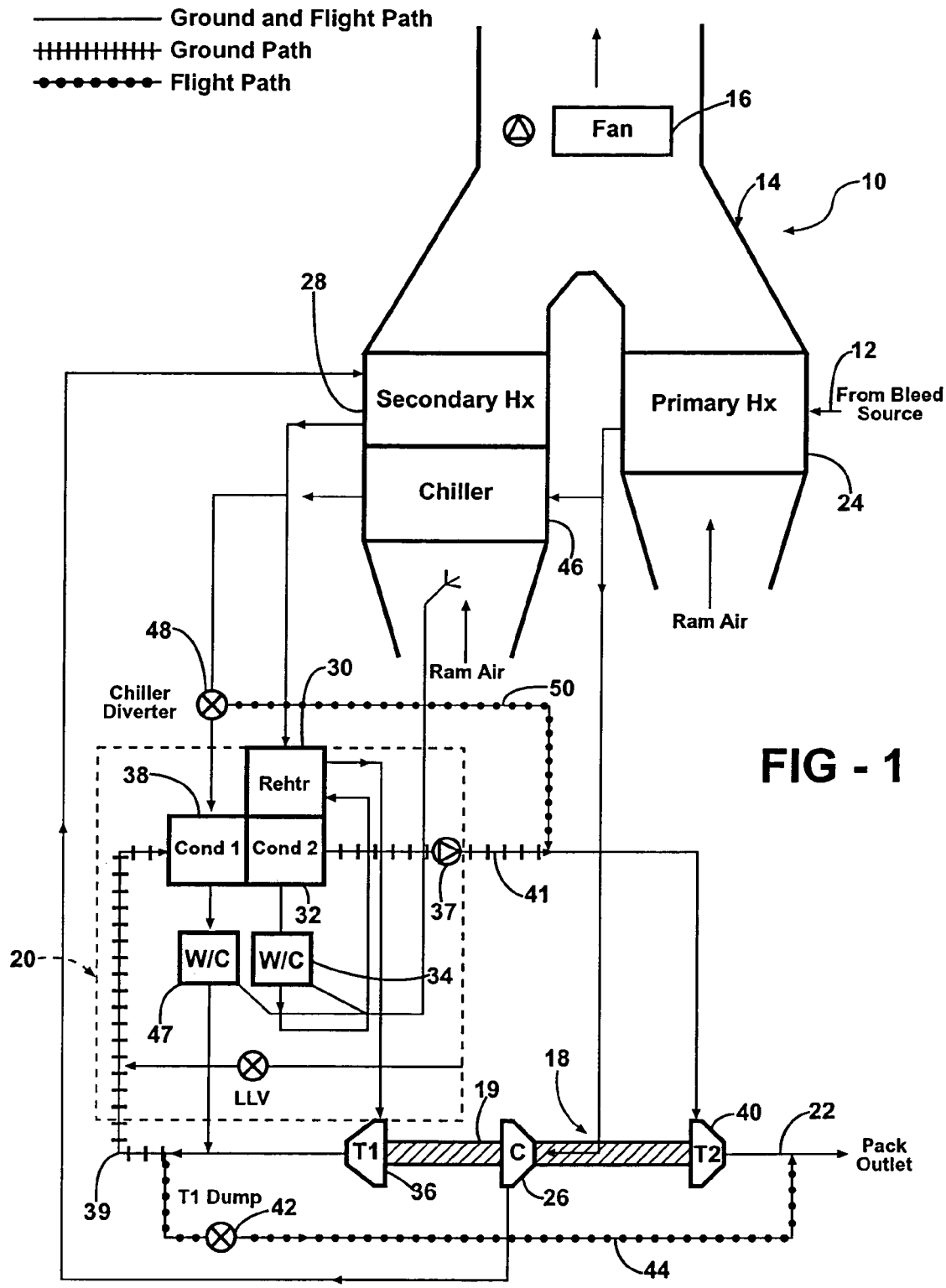
FIG. 1 is a schematic view of one example of the inventive aircraft air conditioning system.

FIG. 1 is a highly schematic depiction of an air conditioning system 10. The system 10 receives air 12 from a pressurized source. The air 12 enters a heat exchanger assembly 14 that draws ram air through the heat exchanger assembly 14 using a fan 16, as is well known in the art. This fan can also be placed on the common shaft 19 of the air cycle machine 18. The air flows through an air cycle machine 18. A three wheel air cycle machine 18 is shown having a common shaft 19. Conditioning circuits 20 receive air from the heat exchanger assembly 14 and air cycle machine 18 to dehumidify and condition the air as desired.

Arrows directed toward a component in the system 10 indicates an inlet to that component. Arrows directed away a component indicates an outlet of the that component.

An air cycle air conditioning system is shown depicted in FIG. 1. The heat exchanger assembly 14 includes primary, secondary, and chiller heat exchangers 24, 28 and 46. While the heat exchanger assembly 14 shown includes three heat exchangers, fewer or greater heat exchangers may be used.

Figure 2:
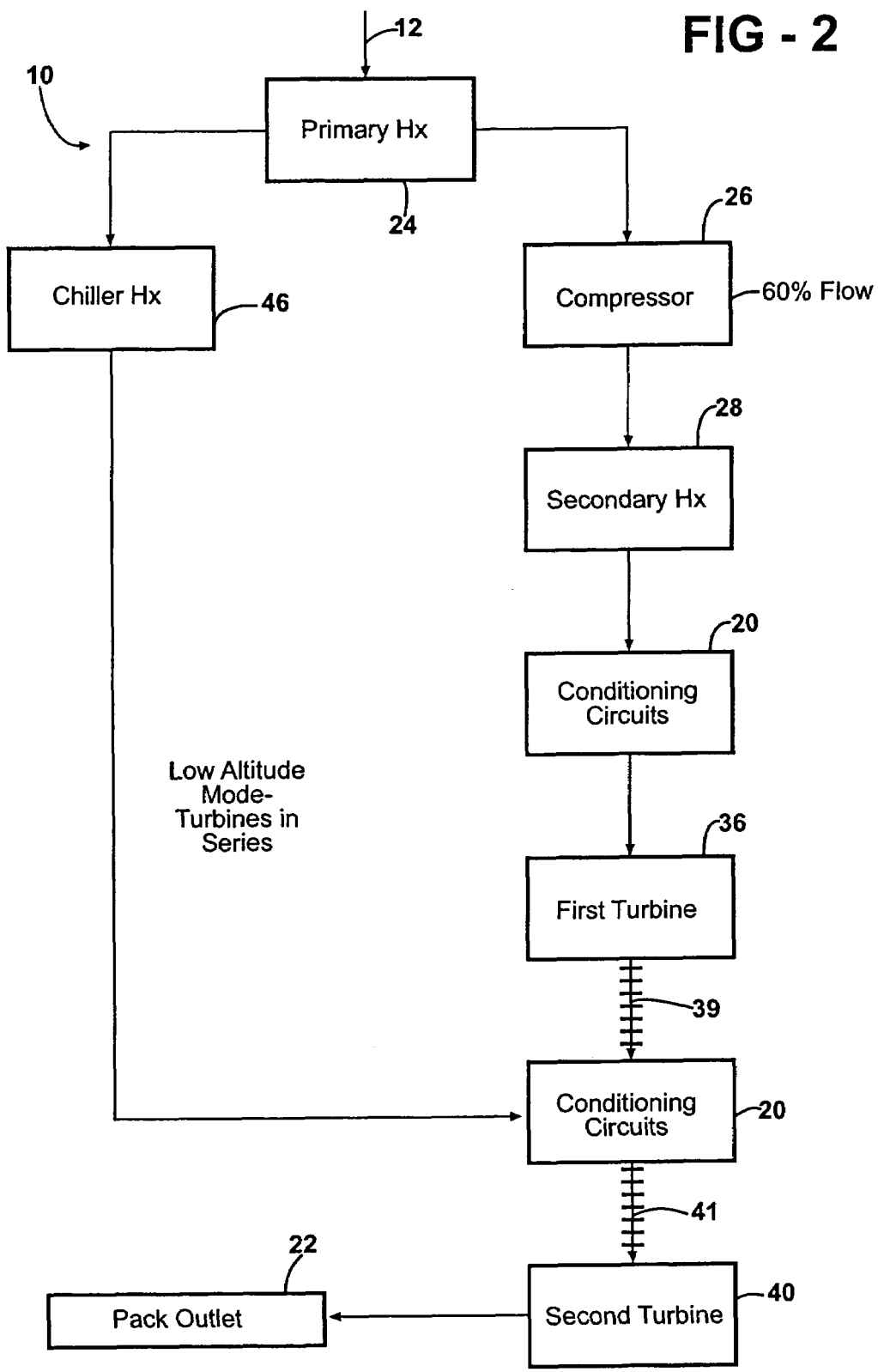
FIG. 2 is a flow chart depicting a low altitude mode in which first and second turbines are fluidly connected in series.

The flow through the system 10 during a low altitude mode will be described with reference to FIGS. 1 and 2. Flow through the system 10 in the low altitude mode is indicated by the solid lines and cross-hatched solid lines in the Figures.

The air 12 enters the primary heat exchanger 24 and flows to the compressor 26 where the air is compressed. Compressed air exits the compressor 26 and enters the secondary heat exchanger 28 to reject heat to the ram air. Air exiting the secondary heat exchanger 28 enters the conditioning circuits 20. Specifically, the air flows through the reheater 30, condenser 32, and water collector 34. As is well understood, the reheater 30 may be eliminated. Moisture from the water collector 34 is drained to a ram air duct. The dehumidified air exiting the water collector 34 enters the reheater 30 from which the air travels to a first turbine 36.

Expanded air from the first turbine 36 flows through a passage 39 into the conditioning circuits 20. Specifically, the air flows from the passage 39 through condensers 38 and 32 to passage 41, which includes a check valve 37. Air from the passage 41 enters a second turbine 40 where the air is further expanded before reaching the pack outlet 22.

The passage 44 fluidly connects the outlet of the first turbine 36 to the outlet of the second turbine 40, or the pack outlet 22. A first turbine dump valve 42 is arranged in the passage 44 for regulating the flow through the passage 44.

Some of the air from the primary heater changer 24 flows to the chiller heat exchanger 46. Air exiting the chiller heat exchanger flows to the conditioning circuits 20. Specifically, the air flows into the condenser 38 and to a water collector 47, which drains moisture to the ram air duct. Dehumidified air from the water collector 47 enters the passage 39 where it flows to the condensers 38 and 32. The air exiting the condenser 32 flows to the second turbine 40 through the passage 41 and check valve 37. The air is expanded by the second turbine 40 before entering the pack outlet 22.

A passage 50 is arranged between an outlet of the chiller heat exchanger 46 and the second turbine 40. A chiller diverter valve 48 is arranged in the passage 50 for regulating the flow through the passage 50. In the low altitude mode both the first turbine dump valve 42 and the chiller diverter valve 48 are in a closed position preventing flow through the passages 44 and 50.

Figure 3:
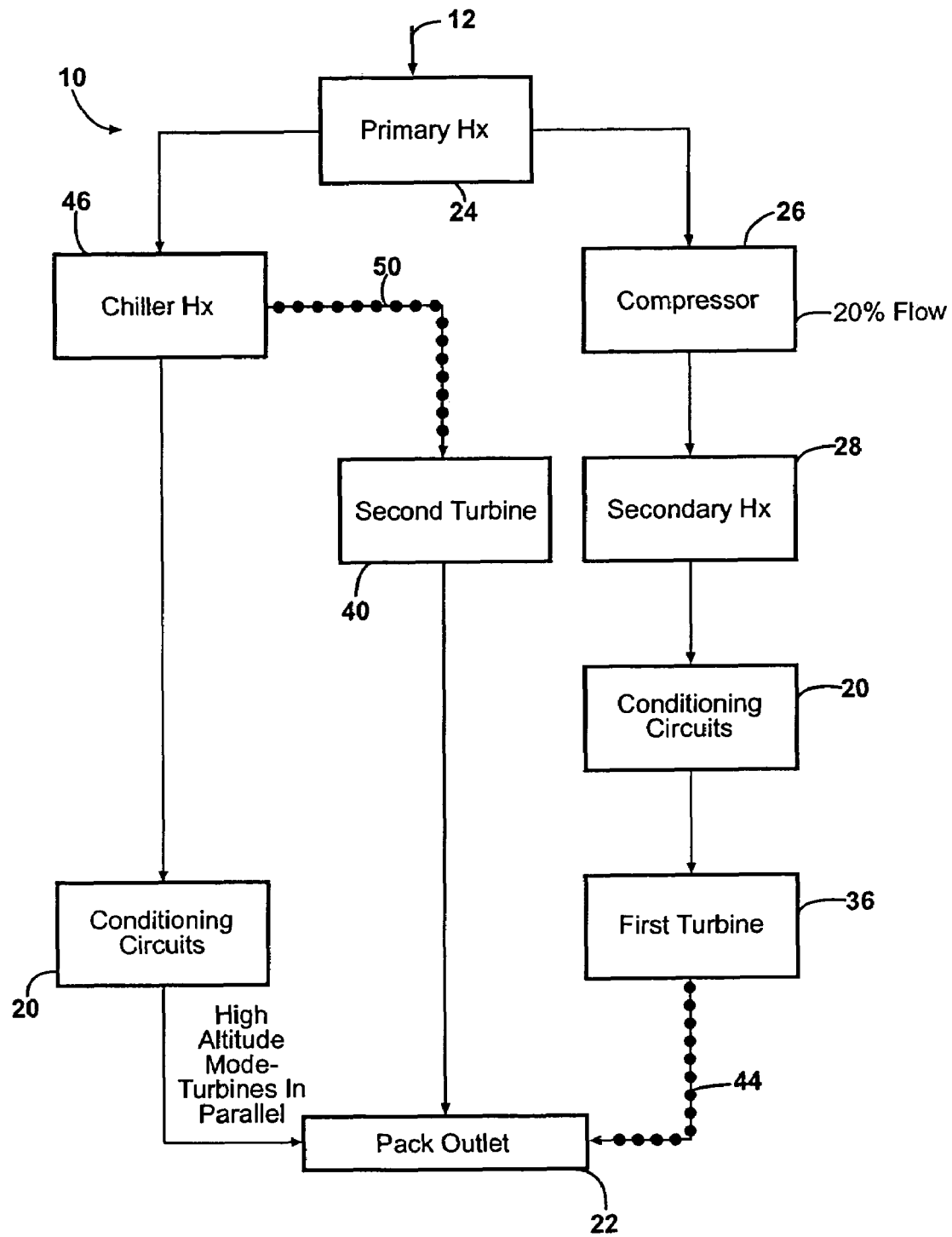
FIG. 3 is a flow chart depicting a high altitude mode in which the first and second turbines are fluidly connected in parallel.

The first and second turbines 36 and 40 operate in the typical series arrangement in low altitude mode. Higher pressure from the air source is utilized which enables cooler air to be supplied from system 10. A high altitude mode, which will be discussed below reconfigures the flow paths to allow the desired amount of air supplied from system 10 with lower air source pressures Referring now to FIGS. 1 and 3, a high altitude mode is depicted. The air pressure 12 provided by the air source is reduced, reducing the power required by the aircraft. The flow of air through the system 10 is desirably reconfigured to improve the efficiency of the system 10 when air is provided by a low pressure source by opening valves 42 and 48. The flow through the system 10 in the high altitude mode is indicated by the solid lines and the solid lines with dots.

Air 12 from the air source flows through the primary heat exchanger 24 to the compressor 26. Compressed air travels to the secondary heat exchanger and flows to the conditioning circuits 20. Specifically, air flows through the reheater 30 and condenser 32 before entering the water collector 34. Dehumidified air exits the water collector 34 and reenters the reheater 30. Air from the reheater 30 flows to the first turbine 36 where it is expanded. The first turbine dump valve 42 is open permitting air to flow through the passage 44 to the pack outlet 22. In this manner, the air exiting the first turbine 36 bypasses the conditioning circuits 20 and second turbine 40.

Air from the primary heat exchanger 24 also flows through the chiller heat exchanger 46. Air exiting the chiller heat exchanger 46 flows through an open chiller diverter valve 47, which permits flow through a passage 50 to the second turbine 40 where the air is expanded and provided to the pack outlet 22. Air exiting the chiller heat exchanger 46 also flows through the conditioning circuits 20. Specifically, air flows through the condenser 38 and water collector 48. The dehumidified air exiting the water collector 47 flows through the passage 44 through the opened first turbine dump valve 42 to the pack outlet 22.

The first and second turbines 36 and 40 operate in a parallel arrangement in the high altitude mode. This provides reduced resistance to supplying air from the air source to the pack outlet 22 and thus allows the system to reduce the pressure required from the air source.

The valves 42 and 48 may be operable in full opened and closed positions and any position there between based upon the flow desired through the system 10.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air conditioning system comprising:
   first and second turbines and a compressor, the second turbine in fluid communication with a pack outlet;
   a passage fluidly connecting the first turbine and the pack outlet; and
   a valve associated with the passage and movable between first and second positions, the second position selectively increasing flow through the passage from the first turbine to the pack outlet relative to the first position to bypass the second turbine reducing pressure required from an air source.

2. The air conditioning system according to claim 1, wherein the first position is an opened position and the second position is a closed position, the opened and closed position respectively corresponding to high and low altitude modes.

3. The air conditioning system according to claim 2, comprising a heat exchanger with fluid flowing from the heat exchanger to the second turbine through an open chiller diverter valve in the high altitude condition, the chiller diverter valve closed in the low altitude mode.

4. The air conditioning system according to claim 3, wherein the high altitude mode includes first and second flow paths, the first flow path including fluid flowing from the heat exchanger to the compressor and returning to the heat exchanger, the fluid flowing from the heat exchanger through conditioning circuits to the first turbine into the pack outlet through the open first turbine dump valve.

5. The air conditioning system according to claim 2, wherein the low altitude mode includes a first and second flow paths, the first flow path including fluid flowing from the heat exchanger to the compressor and returning to the heat exchanger, fluid flowing from the heat exchanger through the conditioning circuits to the first turbine, the flow blocked by a closed first turbine dump valve thereby directing flow from the first turbine through the conditioning circuits to the second turbine and out the pack outlet, the second flow path including flowing the fluid through the heat exchanger past a closed chilled diverter valve through the conditioning circuits to the second turbine and out the pack outlet.

6. The air conditioning system according to claim 4, comprising a heat exchanger assembly including primary, secondary, and chiller heat exchangers providing first and second flow paths.

7. The air conditioning system according to claim 4, comprising a conditioning circuit including a reheater, a condenser, and a water collector.

8. The air conditioning system according to claim 5, comprising a heat exchanger assembly including primary, secondary, and chiller heat exchangers providing first and second flow paths.

9. The air conditioning system according to claim 5, comprising a conditioning circuit including a reheater, a condenser, and a water collector.

10. The air conditioning system according to claim 5, wherein flow from the first turbine is blocked preventing flow from a first turbine outlet to the second turbine.

11. The air conditioning system according to claim 2, wherein pressure from the air source is greater in the low altitude mode than in the high altitude mode in response to the opened position.

12. The air conditioning system according to claim 2, wherein the turbines are fluidly connected in series in the low altitude mode.

13. The air conditioning system according to claim 2, wherein the turbines are fluidly connected in parallel in the high altitude mode.

14. A method of controlling an air conditioning system comprising:
 a) flowing fluid from a first turbine to a second turbine;
 b) moving a valve from a first position to a second position;
 c) diverting flow from the first turbine around the second turbine to a pack outlet in response to performing step b); and
 d) reducing resistance to flow through the system in response to performing step c).

* * * * *